(12) United States Patent
Costabeber

(10) Patent No.: US 9,550,326 B2
(45) Date of Patent: Jan. 24, 2017

(54) STEREOLITHOGRAPHY MACHINE WITH IMPROVED OPTICAL UNIT

(71) Applicant: Ettore Maurizio Costabeber, Zane (IT)

(72) Inventor: Ettore Maurizio Costabeber, Zane (IT)

( * ) Notice: Subject to any disclaimer, the term of this patent is extended or adjusted under 35 U.S.C. 154(b) by 59 days.

(21) Appl. No.: 14/367,431

(22) PCT Filed: Dec. 24, 2012

(86) PCT No.: PCT/IB2012/002789
§ 371 (c)(1),
(2) Date: Jun. 20, 2014

(87) PCT Pub. No.: WO2013/093612
PCT Pub. Date: Jun. 27, 2013

(65) Prior Publication Data
US 2015/0070674 A1    Mar. 12, 2015

(30) Foreign Application Priority Data

Dec. 23, 2011    (IT) .............................. VI2011A0333

(51) Int. Cl.
| | | |
|---|---|---|
| *G03B 27/54* | (2006.01) | |
| *B29C 67/00* | (2006.01) | |
| *B33Y 30/00* | (2015.01) | |

(52) U.S. Cl.
CPC ....... *B29C 67/0081* (2013.01); *B29C 67/0066* (2013.01); *B29C 67/0085* (2013.01); *B33Y 30/00* (2014.12)

(58) Field of Classification Search
CPC ........ B29C 67/0051–67/0096; A61C 13/0013; B33Y 30/00

(Continued)

(56) References Cited

U.S. PATENT DOCUMENTS

| | | | | |
|---|---|---|---|---|
| 4,996,010 A | * | 2/1991 | Modrek | .............. B29C 67/0066 156/273.3 |
| 5,437,964 A | * | 8/1995 | Lapin | ..................... C08G 59/18 430/269 |

(Continued)

FOREIGN PATENT DOCUMENTS

| | | |
|---|---|---|
| CN | 101950079 A | 1/2011 |
| CN | 101821081 B | 6/2014 |

(Continued)

OTHER PUBLICATIONS

Intellectual Property Office of Singapore's Written Opinion, mailed Mar. 13, 2015, corresponding to Application No. 11201403198V.

(Continued)

*Primary Examiner* — Toan Ton
*Assistant Examiner* — Mona M Sanei
(74) *Attorney, Agent, or Firm* — Husch Blackwell LLP

(57) ABSTRACT

Stereolithography machine (1) comprising: a container (2) for a fluid substance (14); a source (3) of predefined radiation (3*a*) suited to solidify the fluid substance (14); an optical unit (4) suited to direct the radiation (3*a*) towards a reference surface (5) in the fluid substance (14); a logic control unit (6) configured to control the optical unit (4) and/or the source (3) so as to expose a predefined portion of the reference surface (5). The optical unit (4) comprises a micro-opto-electro-mechanical system (MOEMS) (7) provided with a mirror (8) associated with actuator means (7*a*) for the rotation around at least two rotation axes (X, Y) incident on and independent of each other, arranged so that it can direct the radiation (3*a*) towards each point of the reference surface (5) through a corresponding combination of the rotations around the two axes (X, Y).

12 Claims, 2 Drawing Sheets

(58) Field of Classification Search
USPC .......................................... 355/67; 264/401
See application file for complete search history.

(56) References Cited

U.S. PATENT DOCUMENTS

| | | | |
|---|---|---|---|
| 8,237,788 | B2 | 8/2012 | Cooper et al. |
| 2004/0105139 | A1 | 6/2004 | Hirose et al. |
| 2005/0078169 | A1 | 4/2005 | Turner |
| 2005/0078345 | A1 | 4/2005 | Turner et al. |
| 2006/0181756 | A1 | 8/2006 | Yamazaki |
| 2008/0055384 | A1 | 3/2008 | Noe et al. |
| 2011/0313560 | A1* | 12/2011 | Hangaard ............. B29C 67/007 700/120 |
| 2015/0076740 | A1* | 3/2015 | Costabeber ......... B29C 67/0066 264/401 |

FOREIGN PATENT DOCUMENTS

| | | |
|---|---|---|
| EP | 1 881 358 A1 | 1/2008 |
| JP | 7-175005 | 7/1995 |
| WO | WO 2009/026520 A1 | 2/2009 |
| WO | WO 2009/044901 A1 | 4/2009 |
| WO | 2011134515 A1 | 11/2011 |
| WO | WO 2011/134515 A1 | 11/2011 |

OTHER PUBLICATIONS

Prof. Jose Carvalho Ferreira, Institute Superior Tecnico—DEM—STM, Technische Universitat Ilmenau—International Scientific Colloquium—Faculty of Electrical Engineering and Information Science—Information Technology and Electrical Engineering—Devices and Systems, Materials and Technologies for the Future—Proceedings Sep. 11-15, 2006, http://www.db-thueringen.de/servlets/DocumentServlet?id=12391.

International Search Report and Written Opinion of PCT/IB2012/002789 dated Mar. 18, 2013.
Jose Carvalho Ferreira; Microstereolithography using digital micromirror devices; Information Technology and Electrical Engineering—Devices and Systems, Materials and Technologies for the Future, Sep. 11-15, 2006 XP055032918A.
Yalcinkaya, et al; Two-Axis Electromagnetic Microscanner for High Resolution Displays; Journal of Microelectromechanical Systems; IEEE Service Center, US; vol. 15, No. 4, Aug. 1, 2006; pp. 786-794.
Deshmukh et al; Optomechanical scanning systems for micorstereolithography (MSL): Analysis and experimental verification; Journal of Materials Processing Technology 209; pp. 1275-1285.
Office Action from corresponding JP patent application 2014-548241, dated Jul. 28, 2015.
English-language translation of Office Action from corresponding JP patent application 2014-548241, dated Jul. 28, 2015.
English-language translation of JP 7-175005.
English-language translation of WO 2009/044901 A1.
DLP a Texas Instruments Technology, DMD Discovery 1100 Chip set, dmddiscovery.com, 2004.
Digital micromirror device, retrieved from Wikipedia, https://en.wikipedia.org/w/index.php?title=Digital_micromirror_device&oldid=673263016, last modified Jul. 27, 2015.
Office Action from corresponding CN patent application 201280063954.6, dated Sep. 6, 2015.
English-language translation of Office Action from corresponding CN patent application 201280063954.6, dated Sep. 6, 2015.
English-language abstract of Chinese patent reference CN 101821081 B.
English-language translation of Chinese patent application publication CN 101950079 A.
Second Written Opinion from corresponding Singapore patent application 11201403198V, issued Oct. 20, 2015.

* cited by examiner

STEREOLITHOGRAPHY MACHINE WITH IMPROVED OPTICAL UNIT

CROSS REFERENCE TO RELATED APPLICATIONS

This application claims priority to PCT Application No. PCT/IB2012/002789, filed Dec. 24, 2012 and to Italian Application No. VI 2011A00333 filed Dec. 23, 2011, both of which are incorporated by reference herein in their entirety.

BACKGROUND AND SUMMARY OF THE INVENTION

The invention concerns a stereolithography machine of the type suitable for making three-dimensional objects by means of a plurality of superimposed layers, wherein each layer is obtained through the selective solidification of a fluid substance in the areas corresponding to the volume of the object to be produced.

A stereolithography machine of the known type comprises a container that contains a fluid substance, generally a light-sensitive resin in the liquid or paste state.

The machine comprises also a source, generally of the luminous type, which emits radiation suited to solidify the fluid substance.

An optical unit provides for conveying said radiation towards a reference surface arranged inside the container, which corresponds to the position of the layer of the object to be solidified.

The three-dimensional object being formed is supported by a modelling plate, which can be moved vertically with respect to the container, in such a way that it is possible to arrange the last solidified layer of the object in a position adjacent to said reference surface.

In this way, once each layer has been solidified, the modelling plate is moved so as to arrange again the solidified layer adjacent to the reference surface, after which the process can be repeated for the successive layer.

The stereolithography machines of the said type are divided in two main embodiments that are described, for example, in the Italian Patent application for industrial invention no. VI2010A000004, in the name of the same applicant who is filing the present invention.

According to the first one of said embodiments, the reference surface is arranged adjacent to the bottom of the container, which is transparent to radiation.

In this case, the fluid substance is irradiated from below and the three-dimensional object is formed under the modelling plate.

According to the second embodiment, the reference surface is arranged at the level of the free surface of the fluid substance.

In this second case, the fluid substance is irradiated from above and the three-dimensional object is formed over the modelling plate.

In both embodiments, the radiation can be conveyed to the different points of the reference surface using different optical units of the known type.

A first type of optical unit comprises a matrix of mirrors that can be controlled individually in such a way as to project the image of the layer of the object on the predefined surface.

In particular, each mirror can assume two different positions, an active position from which the radiation is reflected towards a corresponding point of the reference surface and a passive position from which the radiation is reflected towards a dispersion area.

Said matrices of mirrors are capable of lighting the entire reference surface at the same time, thus making it possible to obtain each layer by means of a single exposure and, consequently, in a particularly quick manner.

However, the matrices of mirrors have limited definition, with the inconvenience that objects with irregular edges are obtained.

A further drawback of the systems mentioned above lies in that the image they generate has uniform luminous intensity on its entire surface.

Therefore, this leads to the inconvenience that said systems do not allow light power to be modulated in the different areas of the reference surface.

In a second type of optical unit the radiation is conveyed to a single point of the reference surface and said point is moved in such a way as to progressively light the entire portion of the reference surface corresponding to the volume of the object.

Compared to the type of optical unit described above, this optical unit offers the advantage that it is possible to direct the light beam towards any point on the reference surface, making it cover continuous trajectories and thus obtaining objects that are free from the irregularities caused by the optical units of the type previously described.

Furthermore, this type of optical units advantageously makes it possible to modify light intensity in the different areas of the reference surface.

According to a known embodiment of the optical unit of the second type described above, a laser light source is provided that is moved on two orthogonal axes by means of a mechanical device.

This embodiment poses the drawbacks that the movements of the light beam are rather slow and that, furthermore, the mechanical device used to move the light beam runs the risk of breaking and therefore needs a certain amount of maintenance.

According to a different embodiment of the optical unit, a fixed source and one pair of galvanometric mirrors are used to direct the light beam, arranged in series one after the other.

Each mirror is motorised, in such a way as to allow it to rotate around a corresponding rotation axis that is orthogonal to the axis of the other mirror, so that the combination of their rotations makes it possible to direct the beam towards any point of the reference surface.

Compared to the known system previously described, the system just illustrated above offers the advantages that it allows the beam to be moved very quickly, which is due to the lower inertia of the galvanometric mirrors, and that it ensures more reliability, thanks to the smaller number of mechanical components used.

Notwithstanding the advantages explained above, the optical unit just described requires that the two mirrors are aligned during the construction of the machine, in such a way as to obtain the correct reflection of the light beam. In fact, in order to have the beam direction correspond to the positions of the mirrors, it is necessary that the beam be incident on both mirrors at the level of the respective rotation axes.

The above mentioned alignment operation poses the drawback that it is particularly complex and increases the cost of the stereolithography machine. Said drawback occurs also in the case where, during use, one or both mirrors break, with the consequence that it is necessary to replace them and align them correctly.

A further drawback is represented by the fact that galvanometric mirrors are relatively expensive, which considerably affects the cost of the stereolithography machine.

An optical unit based on galvanometric mirrors poses the further drawback of being relatively bulky.

The high cost and large size make the stereolithography machine unsuitable for small series applications, which might be required by small craftman's businesses.

Furthermore, galvanometric mirrors have some mechanical components that are subject to wear and therefore limit their advantages compared to the mechanical movement devices mentioned above.

Galvanometric mirrors, furthermore, are characterized by non-negligible inertia, which affects the deviation speed of the light beam and thus also the overall processing time.

The present invention intends to overcome all the above mentioned drawbacks that are typical of the known art.

In particular, it is one object of the invention to provide a stereolithography machine that offers the same advantages offered by the stereolithography machines of the known type based on the use of galvanometric mirrors and that furthermore is simpler to produce and to use compared to the latter.

In particular, it is one object of the invention to avoid the operation of alignment of the mirrors described above, both during production and during use.

The said objects are achieved by a stereolithography machine constructed in accordance with the main claim.

Further detail characteristics of the invention are illustrated in the respective dependent claims.

Advantageously, the fact that it is not necessary to provide for aligning the mirrors considerably simplifies the construction of the stereolithography machine of the invention compared to those of the known type, leading to a consequently lower cost.

It can be understood that said advantage is ensured also when it is necessary to replace the optical unit during use, leading to a reduction in machine maintenance costs.

Furthermore, to advantage, the stereolithography machine of the invention has smaller overall dimensions than the machines of the known type with equivalent potentialities.

Both the advantages illustrated above make the stereolithography machine of the invention convenient also for application in very small series, for which the stereolithography machines of the known type are not suitable.

BRIEF DESCRIPTION OF THE DRAWINGS

Said objects and advantages, together with others that are illustrated below, will be evident from the following description of some preferred embodiments of the invention that are described by way of non-limiting examples with reference to the attached drawings, wherein.

DETAILED DESCRIPTION OF THE PREFERRED EMBODIMENTS

Figure 1:
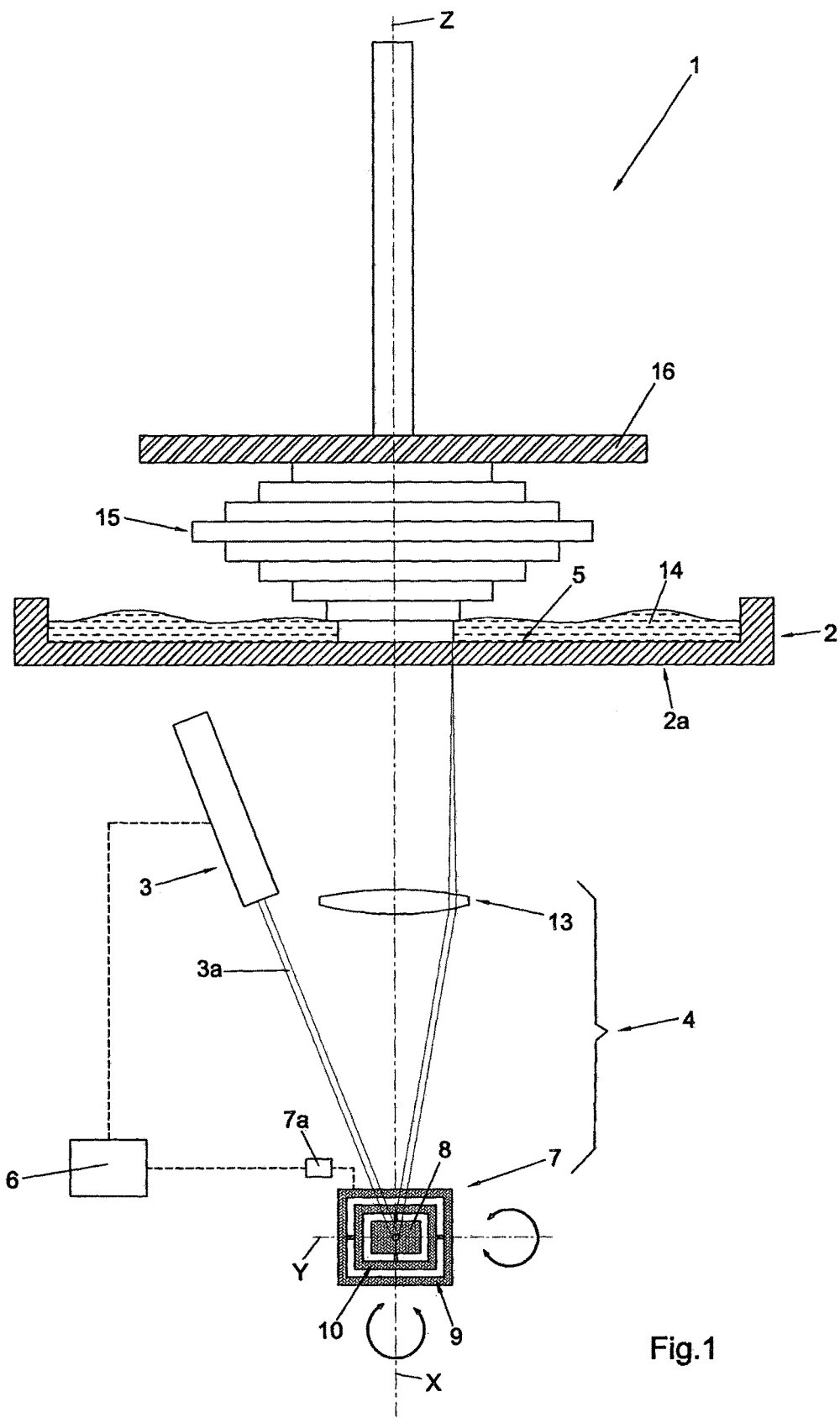
FIG. 1 shows a stereolithography machine according to the invention.

The stereolithography machine that is the subject of the invention, indicated as a whole by 1 in FIG. 1, makes it possible to produce a three-dimensional object 15 by means of a process according to which a plurality of layers are superimposed to one another, said layers being obtained through the selective exposure of a fluid substance 14 to predefined radiation 3a suited to solidify it. Preferably, said fluid substance 14 is a liquid light-sensitive resin and the predefined radiation 3a is a laser light with frequency in the field of the visible or ultraviolet.

Obviously, in construction variants of the invention, the fluid substance 14 can be of any kind, liquid or paste, provided that it is suited to solidify when exposed to predefined radiation 3a.

Analogously, said source 3 of radiation 3a can emit a type of radiation 3a that is different from the one mentioned above, provided that it can solidify the fluid substance 14.

The stereolithography machine 1 comprises a container 2 for said fluid substance 14 and a modelling plate 16 that is suited to support the object 15 being formed and motorised according to a vertical movement axis Z.

The machine 1 comprises also a source 3 suited to emit the predefined radiation 3a and an optical unit 4 suited to direct the radiation 3a towards any point on a reference surface arranged inside the container 2, at the level of the volume occupied by the fluid substance 14.

Preferably, said reference surface is plane and is arranged so that it is adjacent to the bottom 2a of the container 2.

In this case, the optical unit 4 is configured so as to direct the predefined radiation 3a from bottom to top, so that it is incident on the bottom 2a.

Furthermore, the bottom 2a is transparent to the radiation 3a so that the latter can hit the fluid substance 14 arranged in proximity to the bottom and solidify it.

According to this embodiment of the invention, the three-dimensional object 15 is created under the modelling plate 16, as shown in FIG. 1.

According to a variant embodiment of the invention not illustrated herein, instead, the optical unit is configured so as to direct the radiation 3a from top to bottom on the free surface of the fluid substance 14 present in the container 2.

In this case, the object is created over the modelling plate 16.

In both said variant embodiments, the stereolithography machine 1 comprises a logic control unit 6 configured so as to control the optical unit 4 and/or the source 3 in such a way as to selectively expose the fluid substance 14 to the radiation 3a at the level of a predefined portion of the reference surface.

More specifically, said predefined portion corresponds to the portion of volume that corresponds, from time to time, to each layer of the three-dimensional object 15.

According to the invention, the optical unit 4 comprises a micro-opto-electro-mechanical system 7 that in integrated circuit technology is known by the acronym "MOEMS".

As is known, MOEMS devices are produced using the same technology used in microelectronics to make integrated circuits, for example through solid deposition, photolithography, etching etc.

Figure 2:
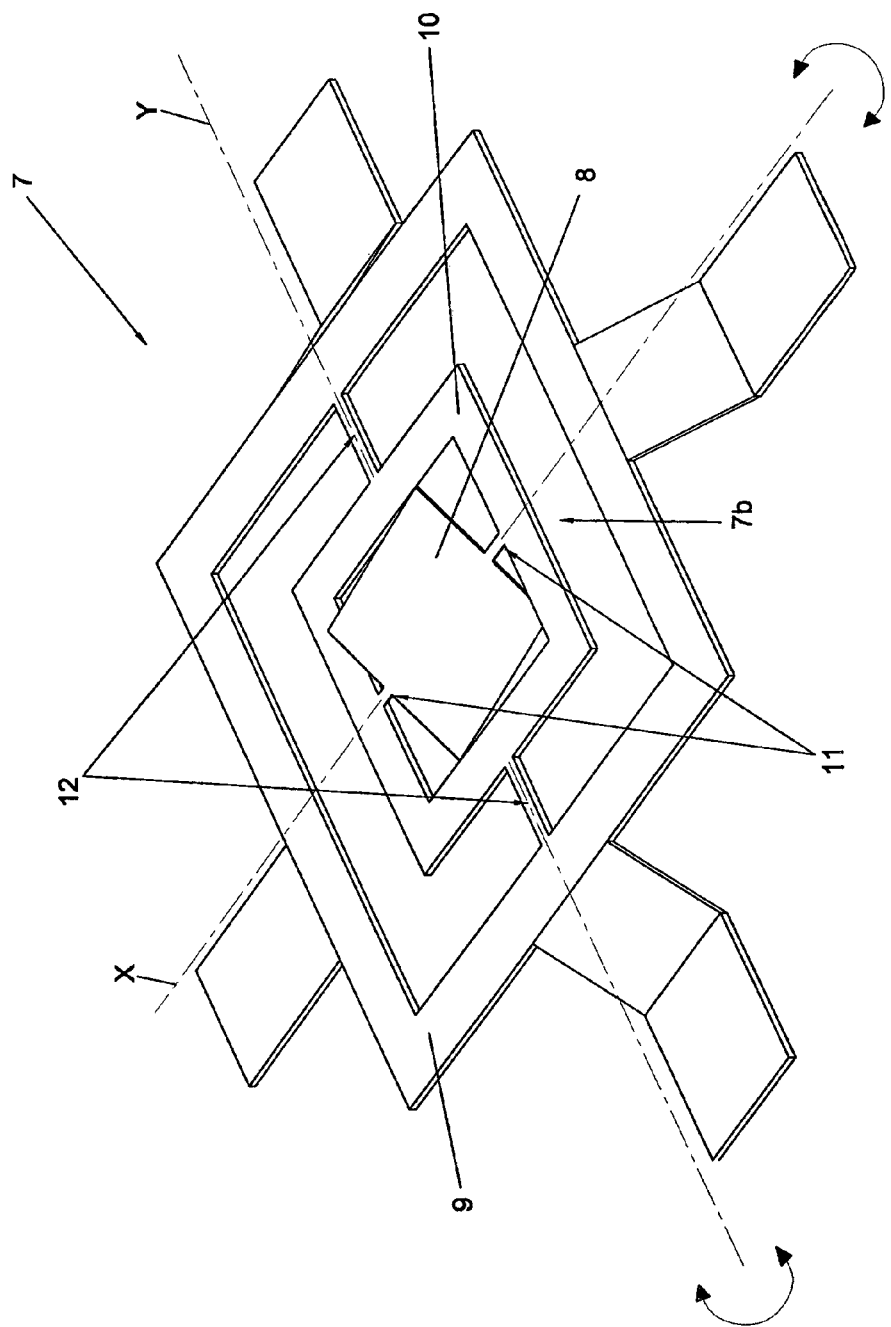
FIG. 2 shows a detail of the stereolithography machine shown in FIG. 1.

Said micro-opto-electro-mechanical system 7, a possible embodiment of which is schematically shown in FIG. 2 by way of non-limiting example, comprises a miniaturised mirror 8, associated with a supporting structure 9 through articulation means 7b configured in such a way as to define two different axes X, Y of rotation of the mirror 8 with respect to the structure 9, mutually incident on and preferably orthogonal to each other.

Said micro-opto-electro-mechanical system 7 also comprises actuator means 7a, of a type known per se, suited to move the mirror 8 around each one of said two axes X and Y independently of the movement around the other axis.

Said actuator means 7a can be of the electrostatic, magnetic, thermo-mechanical type, or of any other known type that can be obtained by means of said MOEMS technology.

The mirror 8 is arranged, with respect to the source 3 and the container 2, so that it can reflect the predefined radiation 3a so as to direct it towards any point of the reference surface through a corresponding combination of the rotations around the two axes X, Y.

Therefore, the invention makes it possible to use a single mirror 8 to direct the radiation 3a towards any point of the reference surface.

Consequently, the need to align several mirrors with one another, as in the case of the known art described above, is avoided, thus achieving the object to simplify the production of the stereolithography 1 and, thus, reduce its cost.

Obviously, said advantage is ensured also in case of replacement of the micro-opto-electro-mechanical system 7 or of part of the same during use, thus making it possible to reduce the maintenance costs of the machine 1.

Still advantageously, the micro-opto-electro-mechanical system 7 described above does not require high precision in angular positioning during assembly. In fact, any slight angular variation in the arrangement of the micro-opto-electro-mechanical system 7 involves only a movement of the reference surface with respect to the container 2, however without producing considerable distortions of the shape of the reference surface and of the predefined portion that is exposed.

Still advantageously, the micro-opto-electro-mechanical system 7 has a lower cost compared to a system based on galvanometric mirrors, which adds the further advantage of reducing the cost of the stereolithography machine 1.

Furthermore, advantageously, the micro-opto-electro-mechanical system 7 has lower inertia than galvanometric mirrors, thus making it possible to obtain higher angular speeds and thus to reduce the time necessary to make the three-dimensional object 15 compared to the stereolithography machines of is the known type, still obtaining the same shape of the object.

Still advantageously, the micro-opto-electro-mechanical system 7 has smaller overall dimensions compared to the typical overall dimensions of the optical units with galvanometric mirrors having the same potentiality, thus making it possible to reduce the overall dimensions of the stereolithography machine 1. Consequently, the invention makes it possible to produce a stereolithography machine 1 that, thanks to its reduced cost and limited overall dimensions, is suited to be used also in applications for which the stereolithography machines of the known type are not suitable.

A further advantage offered by the micro-opto-electro-mechanical system 7 lies in that it absorbs much less energy than the systems with galvanometric mirrors of the known type having equivalent potentiality.

The reduced energy consumption, combined with the considerable compactness, allows the stereolithography machine 1 to be battery powered, making it portable.

It can furthermore be understood that the stereolithography machine 1 described above has all the advantages that are typical of the systems using optical units with galvanometric mirrors, in particular the same precision and the possibility of modulating the power of the radiation 3a in the different areas of the object 15.

Preferably, and as shown in FIG. 2, the articulation means 7b comprise a movable frame 10 that revolvingly supports the mirror 8 around the rotation axis X and is revolvingly associated with the supporting structure 9 according to the rotation axis Y.

This type of connection makes it possible to obtain independent rotations of the mirror 8 according to each one of the above mentioned rotation axes X and Y.

Furthermore, preferably, the mirror 8, the frame 10 and the supporting structure 9 are obtained in a single piece and are connected to each other through corresponding connection areas 11 and 12 that belong to the articulation means 7b and are thin enough to be able to yield elastically according to the respective rotation axes X and Y, so as to allow the mirror 8 to rotate with respect to the frame 10 and the latter to rotate with respect to the supporting structure 9.

In particular, each one of said connection areas 11, 12 operates as a torsion spring that can be deformed to a degree that depends on the pilot voltage of the device.

Obviously, in variant embodiments of the invention the micro-opto-electro-mechanical system 7 can be carried out in any shape, provided that the mirror 8 can rotate around two axes that are independent of and incident on each other.

Regarding the actuator means 7a that move the mirror 8, they are preferably configured so as to rotate the latter around each axis X, Y based on the value of a control signal sent by the logic control unit 6 and representing the angular position that the mirror 8 must assume.

In particular, the logic control unit 6 is configured so as to move the mirror 8 in such a manner that the radiation 3a falls inside the predefined portion corresponding to the layer of the object 15 to be produced following one or more continuous trajectories.

Preferably but not necessarily, said movement is performed according to a single continuous trajectory that covers the entirety of the predefined portion. According to a variant embodiment of the invention, the micro-opto-electro-mechanical system 7 and the corresponding actuator means 7a are configured so as to generate a cyclic movement of the mirror 8, such that the radiation 3a can progressively stimulate the entire reference surface at each cycle.

For example, said cyclic movement may comprise an oscillation of the mirror 8 according to one of the two rotation axes X, Y alternatively in the two rotation directions, preferably obtained by exploiting the resonance frequency of the respective connection areas 11 or 12, which is combined with a rotation on the other axis according to a single direction.

In this way, the radiation 3a is incident on the reference surface 5 and describes a zigzag trajectory that with each one of its segments crosses the reference surface 5 in one of its dimensions and at the same time moves according to the other dimension.

In this last variant embodiment, the logic control unit 6 is configured so as to modify the intensity of the source 3 during said cyclic movement of the mirror 8.

In particular, when the point of incidence is inside the predefined portion of the reference surface 5, the intensity of the source 3 is increased in such a way as to solidify the fluid substance 14 in that point, while when the point of incidence is outside the predefined portion the intensity is decreased in such a way as to avoid solidifying the corresponding portion of fluid substance 14.

The micro-opto-electro-mechanical system 7 described above preferably belongs to an integrated circuit provided with pins for the electric connection to is the machine 1, which is provided with a corresponding connector, or with a base, configured in such a way as to house said pins and allow the integrated circuit to be mechanically fixed to the machine 1.

Preferably, said connector or base is of the type whose insertion requires a limited amount of force.

In variant embodiments of the invention, the micro-opto-electro-mechanical system 7 can be welded directly on the support electronic circuit, avoiding the use of the connector or base.

Regarding the optical unit 4, it preferably comprises one or more lenses 13 configured so as to focus the radiation 3a on the reference surface 5.

Preferably, said lens 13 is of the so-called "flat field" type, such as to focus the radiation 3a on a plane reference surface.

From an operational point of view, the micro-opto-electro-mechanical system 7 is arranged in the stereolithography machine 1 so that the mirror 8 is aligned with the radiation 3a produced by the source 3.

Preferably, the positions of the source 3 and of the micro-opto-electro-mechanical system 7 are such that when the mirror 8 is in a condition in which there is no rotation, that is, when the connection areas 11, 12 are not subjected to torsion, the radiation 3a is reflected towards the central point of the reference surface 5.

However, according to the above, any slight angular misalignments of the micro-opto-electro-mechanical system 7 do not affect the functionality of the machine 1.

Regarding the production of the real three-dimensional object 15, this is carried out with a procedure that is analogous to that used with the optical units with galvanometric mirrors and known per se.

According to the description provided above, it can be understood that the stereolithography machine of the invention allows all the set objects to be achieved.

In particular, the replacement of the galvanometric mirrors with a micro-opto-electro-mechanical system (MOEMS) makes it possible to use a single mirror moving on two independent axes, instead of two mirrors, each moving on a single axis.

The presence of a single mirror makes it possible to avoid the alignment of the mirrors, which is necessary in the machines provided with galvanometric mirrors, both during the machine production stage and after any maintenance carried out on the mirrors, without limiting, however, the potentialities of the is machine.

The micro-opto-electro-mechanical system, furthermore, is more economical, less bulky and less energy-consuming than the galvanometric systems, which makes it possible to produce stereolithography machines that are suitable for small series production and may even be portable.

Further variant embodiments of the invention, even if not described herein and not illustrated in the drawings, are all to be considered protected by the present patent, provided that they fall within the scope of the claims expressed below. Where technical features mentioned in any claim are followed by reference signs, those reference signs have been included for the sole purpose of increasing the intelligibility of the claims and accordingly such reference signs do not have any limiting effect on the protection of each element identified by way of example by such reference signs.

The invention claimed is:

1. A stereolithography machine comprising:
   a container for a fluid substance suited to be solidified through exposure to radiation;
   a laser source for providing said radiation, said radiation including a laser light with a visible or ultraviolet frequency;
   an optical unit operable to selectively direct said radiation towards any point of a reference surface arranged inside said container; and
   a logic control unit configured to control said optical unit and/or said laser source in such a way as to scan and solidify a portion of a volume of the fluid substance adjacent to said reference surface,
   wherein said optical unit comprises a micro-opto-electro-mechanical system (MOEMS) including:
      a single mirror associated with a supporting structure through an articulation member configured so as to define for said mirror at least two independent rotation axes; and
      an actuator operable to move said mirror around each one of said two axes,
   wherein said mirror is arranged with respect to said laser source and to said container in such a way as to be able to direct said radiation towards each point of said reference surface through a corresponding combination of rotations around said two axes, and
   wherein said actuator is configured so as to rotate said mirror around each one of said two axes in such a way as to arrange said mirror in an angular position in response to a control signal emitted by said logic control unit, said control signal having a value corresponding to said angular position.

2. The stereolithography machine according to claim 1, wherein said two rotation axes are mutually orthogonal and wherein the actuator is operable to move the mirror around each one of the two axes independently of the movement around the other one of said two axes.

3. The stereolithography machine according to claim 1, wherein said articulation member comprises a frame revolvingly supporting said mirror around a first one of said rotation axes, said frame being revolvingly associated with said supporting structure around the second one of said rotation axes.

4. The stereolithography machine according to claim 3, wherein said articulation member comprises a first connection portion, arranged between said mirror and said frame, said first connection portion elastically yielding around a first one of said rotation axis, and a second connection portion arranged between said frame and said supporting structure, said second connection portion elastically yielding around said second rotation axis.

5. The stereolithography machine according to claim 1, wherein said logic control unit is configured to move said mirror so that an incidence point of said radiation on said reference surface defines a continuous trajectory that covers the entirety of said portion.

6. The stereolithography machine according to claim 1, wherein said MOEMS is part of an integrated circuit provided with pins for electrical connection, wherein said stereolithography machine comprises a corresponding connection member configured to house said pins in such a way as to mechanically fix said integrated circuit.

7. The stereolithography machine according to claim 1, wherein said optical unit comprises at least one lens configured as a flat field type to focus said radiation on said reference surface.

8. The stereolithography machine according to claim 1 wherein the logic control unit is configured to selectively modify intensity of the laser source during the scanning such that the intensity of the laser source is selectively increased in such a manner as to solidify the fluid substance and the intensity is selectively decreased in such a manner as to avoid solidifying the fluid substance.

9. The stereolithography machine according to claim 1 wherein the actuator is at least one of an electrostatic type and a thermo-mechanical type to move the mirror.

10. The stereolithography machine of claim 1 wherein the reference surface is adjacent to a transparent bottom of the container and the radiation is directed so that it passes through the bottom to scan the fluid substance in proximity to the bottom.

11. A micro-opto-electro-mechanical system (MOEMS) for use in a stereolithography machine including a container for a fluid substance, a logic control unit, and a laser source of radiation, the MOEMS comprising:

a single mirror configured to revolve around at least two independent rotation axes in order to selectively direct said radiation towards any point of a reference surface arranged inside said container so as to rotate said mirror around each one of said two axes in such a way as to arrange said mirror in an angular position in response to a control signal emitted by said logic control unit, said control signal having a value corresponding to said angular position such that the selectively directed radiation scans and solidifies a portion of a volume of the fluid substance adjacent to the reference surface.

12. The micro-opto-electro-mechanical system of claim 11 further comprising an actuator operable to move the mirror around each one of the two independent axes independently of the movement around the other one of the two independent axes.

* * * * *